US006977868B2

(12) United States Patent (10) Patent No.: US 6,977,868 B2
Brewer et al. (45) Date of Patent: Dec. 20, 2005

(54) METHOD AND APPARATUS FOR SYNCHRONIZING DATA BETWEEN A WATCH AND EXTERNAL DIGITAL DEVICE

(75) Inventors: Donald R. Brewer, Richardson, TX (US); Jeffrey Keith Bruneau, Plano, TX (US); Brian Richard Delaney, Rockwall, TX (US)

(73) Assignee: Fossil, Inc, Richardson, TX (US)

( * ) Notice: Subject to any disclaimer, the term of this patent is extended or adjusted under 35 U.S.C. 154(b) by 261 days.

(21) Appl. No.: 10/075,704

(22) Filed: Feb. 14, 2002

(65) Prior Publication Data

US 2003/0151982 A1 Aug. 14, 2003

(51) Int. Cl.⁷ .............................................. G04C 1/00
(52) U.S. Cl. ..................................................... 368/46
(58) Field of Search .............................. 368/46–47, 10; 455/231

(56) References Cited

U.S. PATENT DOCUMENTS

| | | | |
|---|---|---|---|
| 5,477,508 A | | 12/1995 | Will |
| 5,727,202 A | | 3/1998 | Kucala |
| 5,771,399 A | * | 6/1998 | Fishman ...................... 710/72 |
| 5,799,315 A | | 8/1998 | Rainey et al. |
| 6,134,536 A | | 10/2000 | Sheperd |
| 6,157,982 A | * | 12/2000 | Deo et al. ................... 711/100 |
| 6,198,696 B1 | | 3/2001 | Korpi et al. |
| 6,219,303 B1 | * | 4/2001 | Morohoshi et al. ........... 368/47 |
| 6,243,705 B1 | | 6/2001 | Kucala |
| 6,421,650 B1 | * | 7/2002 | Goetz et al. .................. 705/3 |
| 6,525,997 B1 | * | 2/2003 | Narayanaswami et al. .. 368/223 |
| 6,556,222 B1 | * | 4/2003 | Narayanaswami .......... 345/786 |
| 6,671,700 B1 | * | 12/2003 | Creemer et al. ............ 707/201 |

OTHER PUBLICATIONS

*onHand: PC Software Manual*, Matsucom: 1999.
"Palm Operating System Platform." Apr. 23, 2001. <http://www.palmos.com>.
"Palm Products." Apr. 24, 2001. <http://palmcomputing.palmgear.com>.
"Palm Software." Apr. 24, 2001. <http://www.palm.com>.
"Epson Chrono-Bit." Apr. 24, 2001. <http://www.i-love-epson.co.jp/chrono-bit/info/index.html>.
"EDN Access." Apr. 24, 2001. <http://www.ednmag.com/ednmag/reg/1995/122195/26df2.htm>.
"onHand—The World's Smallest PDA!" Apr. 24, 2001. <http://www.onhandpc.com>.
"PCWorld.com" Apr. 24, 2001. <http://www.pcworld.com>.
"Casio." Apr. 23, 2001. <http://www.casio.com>.
"Casio PC Unite Data Watch Model BZX201." Apr. 24, 2001. <http://store.yahoo.com/brandsmall/0035-bzx201.html>.
*Managing Handhelds across the Enterprise: Application Brief*, Palm, Inc: 2001.

* cited by examiner

*Primary Examiner*—Kamand Cuneo
*Assistant Examiner*—Thanh S. Phan
(74) *Attorney, Agent, or Firm*—David W. Carstens; Carstens & Cahoon, LLP

(57) ABSTRACT

The present invention is an apparatus and method for synchronizing and updating the memory of an external digital device, such as a personal digital assistant, and the memory of a watch via a two way communication link providing for the synchronous transfer of data between the devices. The data transfer is accomplished by placing the external digital device and watch into an alignment device which secures and positions each device in an appropriate spatial relationship allowing data to be transferred between devices. A separate integrated display controller provides for operation of the watch display thereby conserving power required to operate the device.

21 Claims, 11 Drawing Sheets

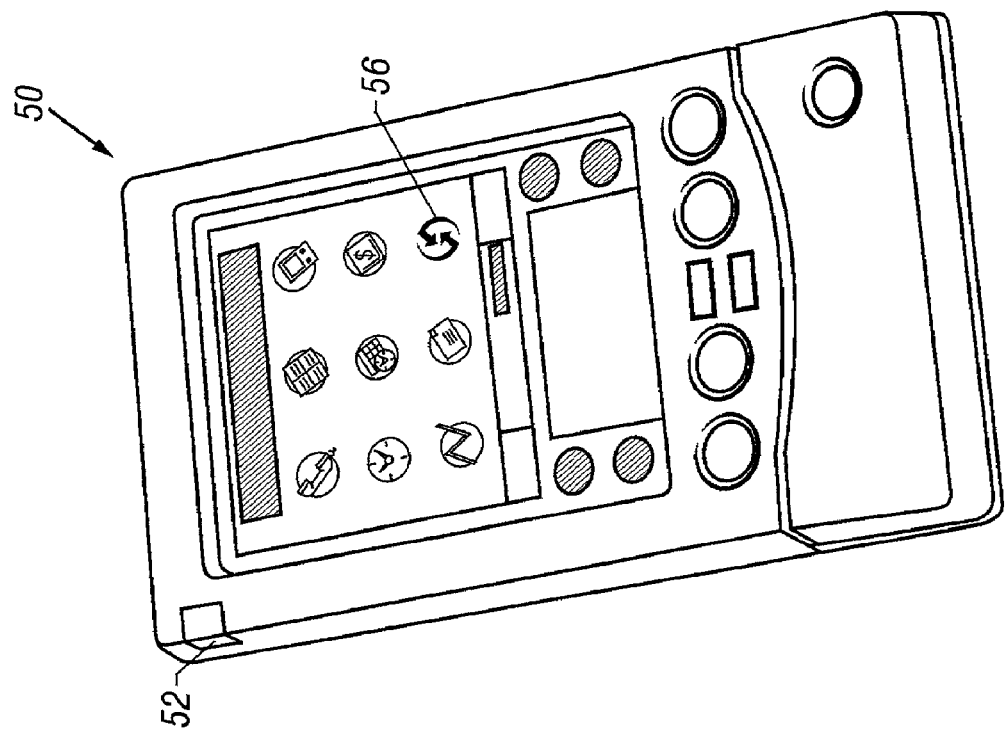
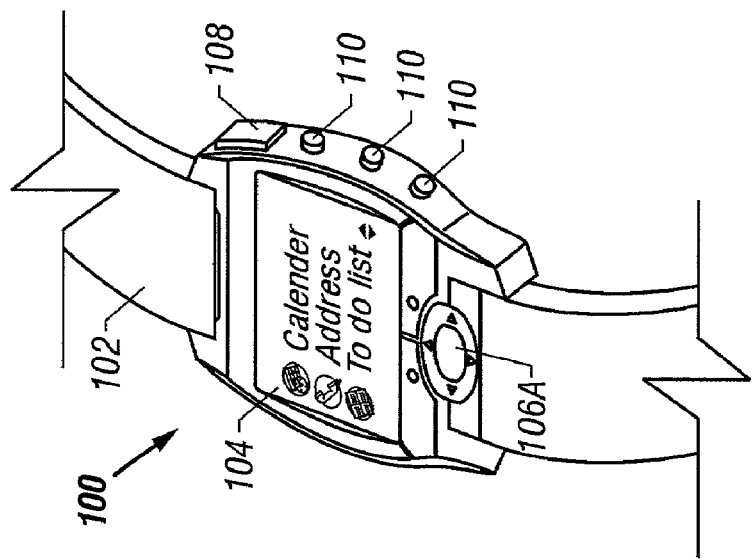
FIG. 3A

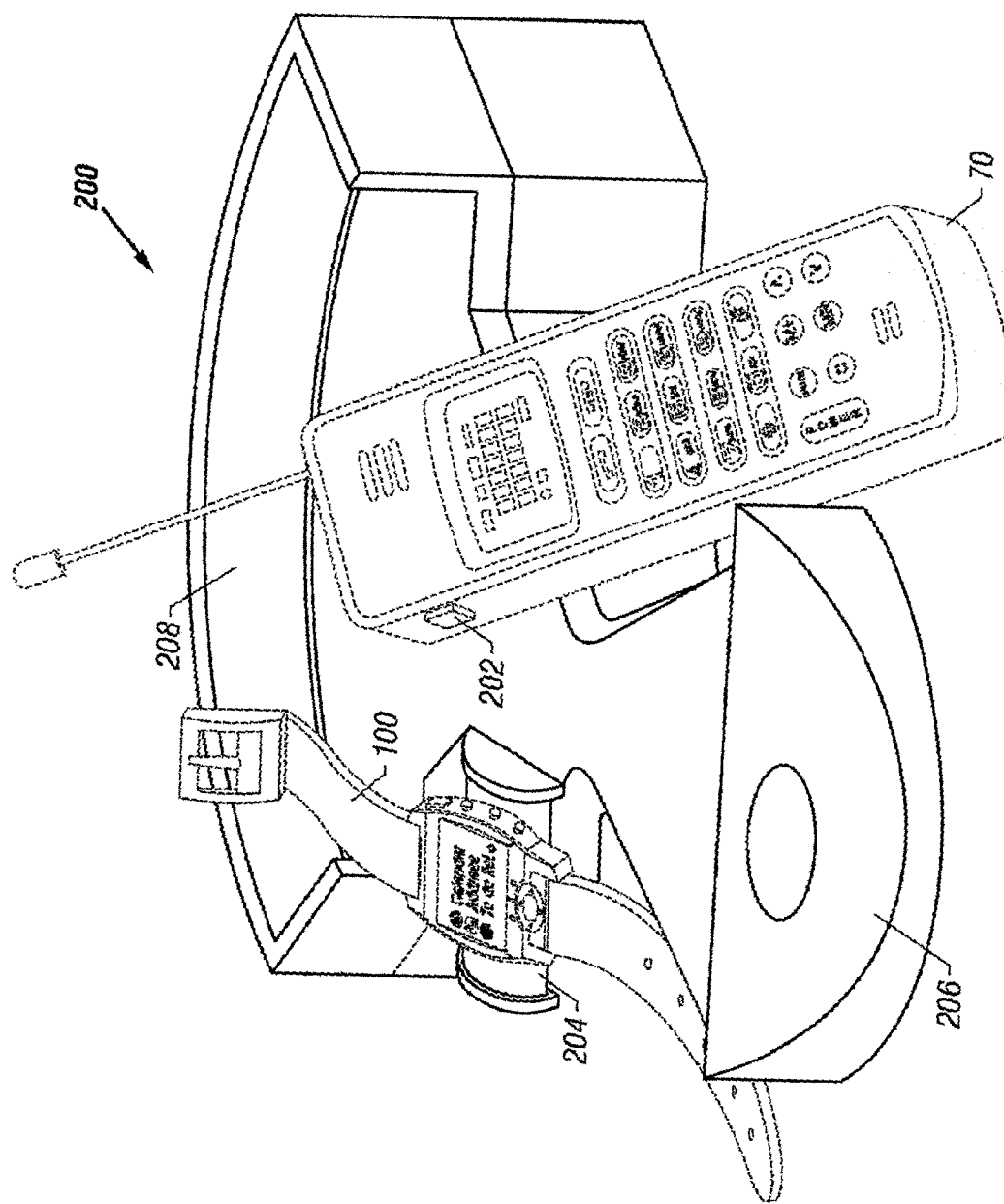

METHOD AND APPARATUS FOR SYNCHRONIZING DATA BETWEEN A WATCH AND EXTERNAL DIGITAL DEVICE

BACKGROUND OF THE INVENTION

1. Technical Field

This invention relates to a method and apparatus of managing synchronous information exchange between electronic devices. More specifically, the invention is concerned with a method and apparatus for synchronizing information contained on a wrist watch with an external digital device via a two way communication link. A separate display controller is also incorporated into the watch as a separate measure to conserve battery power associated with the display of time and watch functions.

2. Description of Related Art

In recent years, there has been an increasing use of compact, pocket-size electronic personal organizers or personal digital assistants ("PDA") that store personal scheduling information such as appointments, tasks, phone numbers, flight schedules, alarms, birthdays, and anniversaries. PDA's come in all different shapes and sizes as well as being incorporated into wireless telephones, wireless pagers and wrist watches. Some of the more common PDA's, like the Palm™ personal digital assistant devices, are equipped with a touch screen for navigation and input of information. Some models even have an attachable input keyboard with both numeric keys and alphabetic keys, as well as special function keys. PDA's may also incorporate a liquid crystal display (LCD) which displays data, text and graphics.

PDA's prove most useful to busy individuals who are frequently traveling or always on the move from one meeting to the next appointment. Unfortunately, due to their hectic schedules, these individuals are the people most likely to forget their PDA's during the frantic rush to gather documents, files, laptops, cellular phones, and travel tickets before departing home or office for their destinations. As such, it would be desirable to reduce the number of electronic digital devices that these individuals need to remember for business or personal purposes.

With the development of digital watches over the last twenty years, watches have been used to perform a variety of different functions, including games, calculator, various timers, alarms, and sport-related time-keeping functions. Support of these additional functions has required more complicated user interface solutions, which have tended towards an increasing number of push buttons. Watches are now capable of serving as personal information managers, wireless phones, and contain other advanced functionalities, which has required an entirely new user interface solution to simplify user operation. Likewise, digital watches have evolved to the point that they can function as PDA's. Like the pocket-size devices described above, such watches can be programmed with certain key appointments, tasks, phone numbers, flight schedules, alarms, birthdays, and anniversaries. Watches are part of everyday fashion attire, are more ruggedized, and more convenient to carry and less likely to be forgotten by busy people.

However, it is much more difficult to enter data into a watch than it is to enter the same data into a PDA. This difficulty is due in large part to the limited space for input buttons and display characters available on digital wristwatches. Most watches are limited to having only three or four input buttons. A user programs a watch by depressing one or more buttons several times to cycle through various menu options. Once an option is selected, the user depresses another button or buttons to input the desired information. These input techniques are inconvenient and difficult to remember. Such techniques are particularly inconvenient when a wearer wishes to enter an entire month's schedule. Although watches have been made with larger numbers of input keys, such watches are usually much too large for comfort, and tend to be particularly unattractive.

Apart from personal organizers, it is common for many people to maintain appointment calendars and task lists on their PDA's, personal computers (PCs) or cell phones. One example of time management software on the PC is Microsoft's OUTLOOK and on PDA's and cell phones the Palm OS operating system which maintain daily appointment schedules, to-do lists, personal notes, and calendar planning for personal computers. This information is often a duplicate of that maintained on the portable personal organizer, such as the various models produced by Microsoft, Palm and HandSpring.

Timex Corporation of Middlebury, Conn., has recently introduced the Timex Data-Link™ watch. This watch utilizes new technology for transferring information from a personal computer to a watch. The face of the watch has an optical sensor, which is connected to a digital serial receiver, better known as a UART (universal asynchronous receiver/transmitter). The watch expects to receive a serial bit transmission in the form of light pulses at a fixed bit rate. A pulse represents a binary '0' bit, and the absence of a pulse represents a binary '1' bit.

The CRT (cathode ray tube) or other scanned-pixel display of a personal computer is used to provide light pulses to the watch. Although it appears to a human viewer that all pixels of a CRT are illuminated simultaneously, the pixels are actually illuminated individually, one at a time, by an electron beam, which sequentially scans each row of pixels beginning with the top row and ending with the bottom row. It is this characteristic of a CRT and of other scanned display devices which is utilized to transmit serial data to the Data-Link™ watch. To transfer data to the watch, the watch is held near and facing the CRT. The computer is programmed to display a sequence of display frames in which spaced horizontal pixel lines represent individual bits of data to be transferred. Lines are illuminated or not illuminated, depending on whether they represent binary '0' bits or binary '1' bits. Each line appears as a continuous pulse of a finite duration to the receiving watch. The watch recognizes an illuminated line as a binary '0' bit. It recognizes a non-illuminated line as a binary '1' bit. Generally, ten bits are transmitted in a single CRT display frame: eight data bits, a start bit, and a stop bit. As used herein, the term "display" means a single screen-size image made up of a matrix of pixels. A display is generally created by sequentially illuminating or refreshing the pixels of the display device.

One of the drawbacks in remotely programming small-size PDA's and watches is that there is no convenient way to easily transfer data between a PDA and a wristwatch. Instead, entire data sets must be carefully entered by the user during each programming session. If a data entry error is made or the user wishes to make a change, the user must fix the error or make the change at the wrist watch utilizing miniature control inputs. Another drawback is the relatively large power consumption requirements of small PDA's and watches with touch screen data manipulation. Prior art devices require a microcontroller and processor to function a majority of the time in order to keep the PDA or watch properly functioning. Naturally, this results in a shortened battery life span for these devices.

Accordingly, it is an object of this invention to provide a memory management technique that enables a user to access and manipulate a menu driven operating system to synchronize, download and upload data from a user's wristwatch to an external digital devices, such as a PDA or cell phone, quickly and with very little, if any, user intervention. It is another object of this invention to provide a method of watch power management which prolongs the power supply available to a watch with a touch screen display.

SUMMARY OF THE INVENTION

The present invention is an apparatus and method for updating the memory of an a watch and an external digital device, such as a personal digital assistant (PDA), via a two way communication link providing synchronous transfer of data between the devices. Synchronization is accomplished by a software driven menu system, such as the PALM O/S operating system, and orienting the PDA and wrist watch in an appropriate spatial relation to effect wireless transfer of information according to the data transfer methodology utilized by the particular device operating system.

When a user desires to synchronize and update information between the PDA and watch, the user activates the watch microcontroller, processor and data transfer mechanism by contacting the watch display. The watch microcontroller and processor inside the watch are powered up, along with the data transfer system, and data synchronization occurs which proceeds to alter the virtual memory of the watch's initial data arrangement to the modified arrangement. Upon the initiation of synchronous data transfer, the PDA memory manager and watch memory manager operate to derive appropriate memory transactions which provide for the upload and download of data between devices resulting in the creation of synchronized data.

A separate watch display controller is provided to operate watch display. This allows the watch microcontroller to activate and function as necessary for watch operations, thereby conserving watch battery power. The separate display controller maintains the information on the watch face as desired by the user without the need for the watch microcontroller to constantly run in an active mode.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A depicts one embodiment of a digital wristwatch with synchronous data transfer capability and a menu of available functions which are controlled and accessed via a combination of multi directional scrollpad and push buttons along with a depiction of a Palm™ personal digital assistant for synchronized data transfer between devices;

FIG. 5 depicts an alignment device for spatial placement of an external digital device and watch during synchronous data transfer operations that provide at least one intervening surface for the reflection of a wireless data stream during synchronous data transfer. This reflective design allows the user to operate and use both the watch and PDA input control mechanisms or adjust the devices in preparation for or during data transfer;

DETAILED DESCRIPTION OF THE PREFERRED EMBODIMENTS

Figure 1:
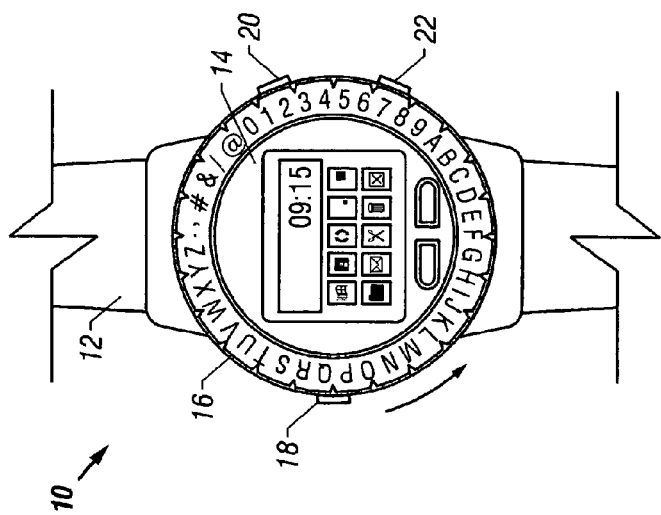
FIG. 1 is a representative example of the prior art disclosing a wristwatch with push button data entry means.

Turning to FIG. 1, prior art device 10 is shown which incorporates data management functions into a computing device sized for the wrist. It is representative of prior art solutions for entering data onto wrist watch sized devices, involving a movable circumferential ring or thumbwheel 16 around the watch face 14 that can be rotated to the desired alphanumeric character. Buttons 18, 20, 22 are then pressed by the user in a certain sequence to enter the desired alphanumeric character and perform other watch operations. However, the problem with the current implementation of the thumbwheel 16 interface on watches is that in all implementations buttons 18, 20, 22 are still required to manipulate and enter alphanumeric data. Although the convenience of this type of button control mechanism for the selection and de-selection of data is relevant in a wrist watch application, buttons 18, 20, 22 must be of sufficient size to allow a user to manipulate them which results in a larger watch size and inefficient use of the watch volume. Thumbwheel type devices must have an opening through which to move and perform desired functions. This requirement provides an entry point for water or other foreign matter into the internal regions of the watch. Naturally, the incursion of water or foreign substances into the interior watch region usually damages the watch operating components and leads to the complete operational failure of the watch. Moreover, the referenced prior art device does not disclose or provide for a system and method of synchronously updating and transferring data stored on a personal digital assistant and wrist watch via a two way communication link.

Figure 2:
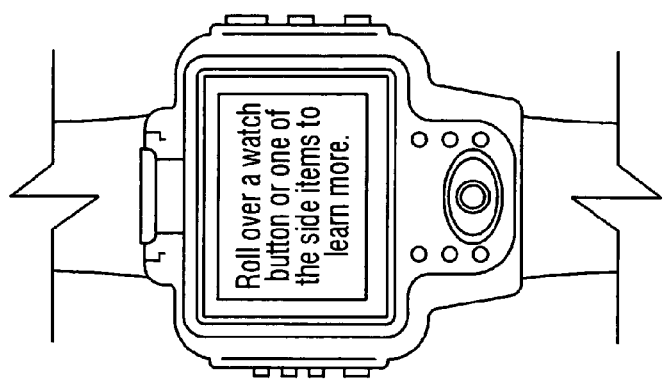
FIG. 2 is a depiction of a prior art watch requiring data entry by manipulation of push buttons for the entry of data.

FIG. 2 displays another prior art device which utilizes a push button apparatus to implement data management. Once again, the user is required to input and manipulate data on the wrist watch by using small pushbuttons to implement instructions.

FIG. 3A discloses one embodiment of the present invention wherein a digital watch 100 is shown accompanied with a PALM personal digital assistant device 50. Watch 100 includes a wrist strap 102, buttons 110, and scrollpad control 106A. A menu of functions stored in the watch memory are displayed on the watch face display 104 which may include an electronic calendar, address book and task list. The watch face display 104 may consist of a touch screen or an electrophoretic display. Data transfer mechanism 108 allows for the two way transmission and receipt of data via wireless signals, such as IR radiation, RF waves and microwaves. FIG. 3A displays the simplified user interface of the present invention which features a multi-directional scrollpad 106A with data entry capability, along with support buttons 110 that may perform additional programmable functions. For example, one button 110 may act as a "home button" always returning the user back to the main menu, while the other buttons 110 may act as a toggle or menu direction button depending on where the user is in the operating system program. Additionally, FIG. 3A shows a personal digital assistant device 50 with and port 52 which allows for the transmission and receipt of data via wireless signals. Synchronization icon 56 represents a software short cut, stored on an internal memory unit, capable of initiating synchronization routines between devices according to the method disclosed herein and U.S. Pat. No. 6,243,705 (Kucala) and U.S. Pat. No. 5,727,202 (Kucala).

Figure 3C:
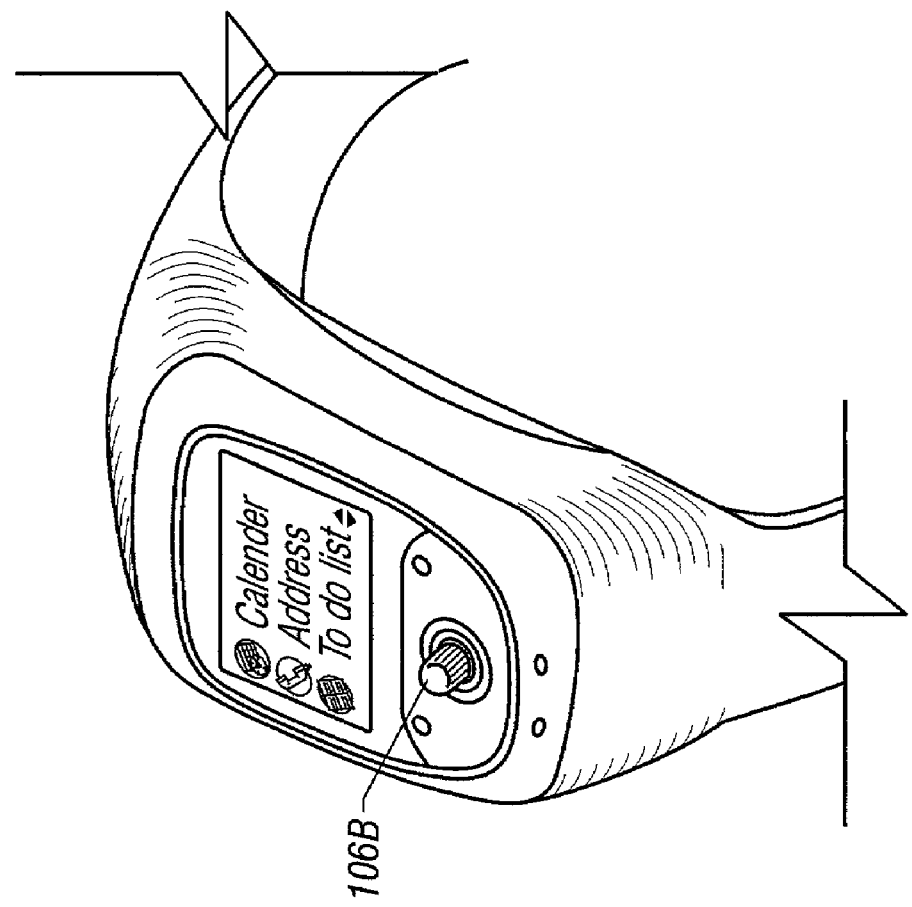
FIG. 3C depicts the menu of available functions on the digital wrist watch which are controlled and accessed by a joystick mechanism.
Figure 3B:
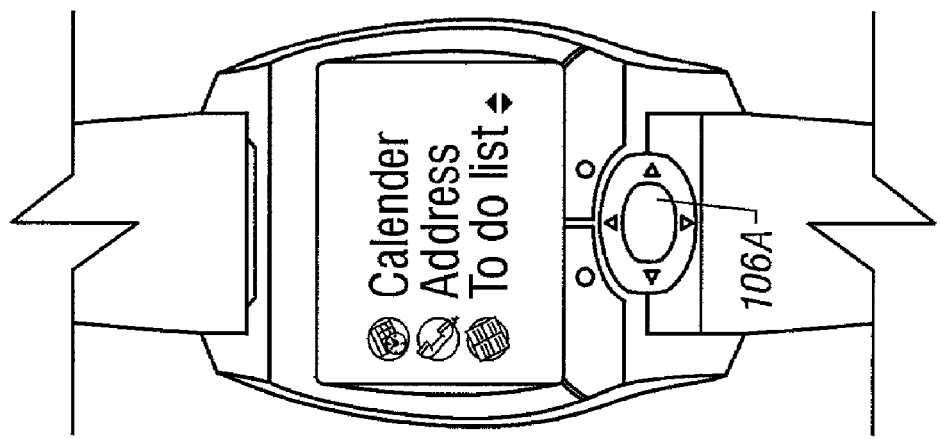
FIG. 3B depicts the menu of available functions located on the digital wrist watch which are controlled and accessed by a scrollpad.

FIG. 3B is a top view of watch 100 with scrollpad 106A capability used to control the navigation and function menus of the watch 100, including initiation of synchronous data transfer between the wrist watch 100 and Palm personal digital assistant device 50.

FIG. 3C depicts the watch 100 integrated with a joystick 106B control mechanism for the actuation and control of various watch and menu functions discussed herein.

Figure 4:
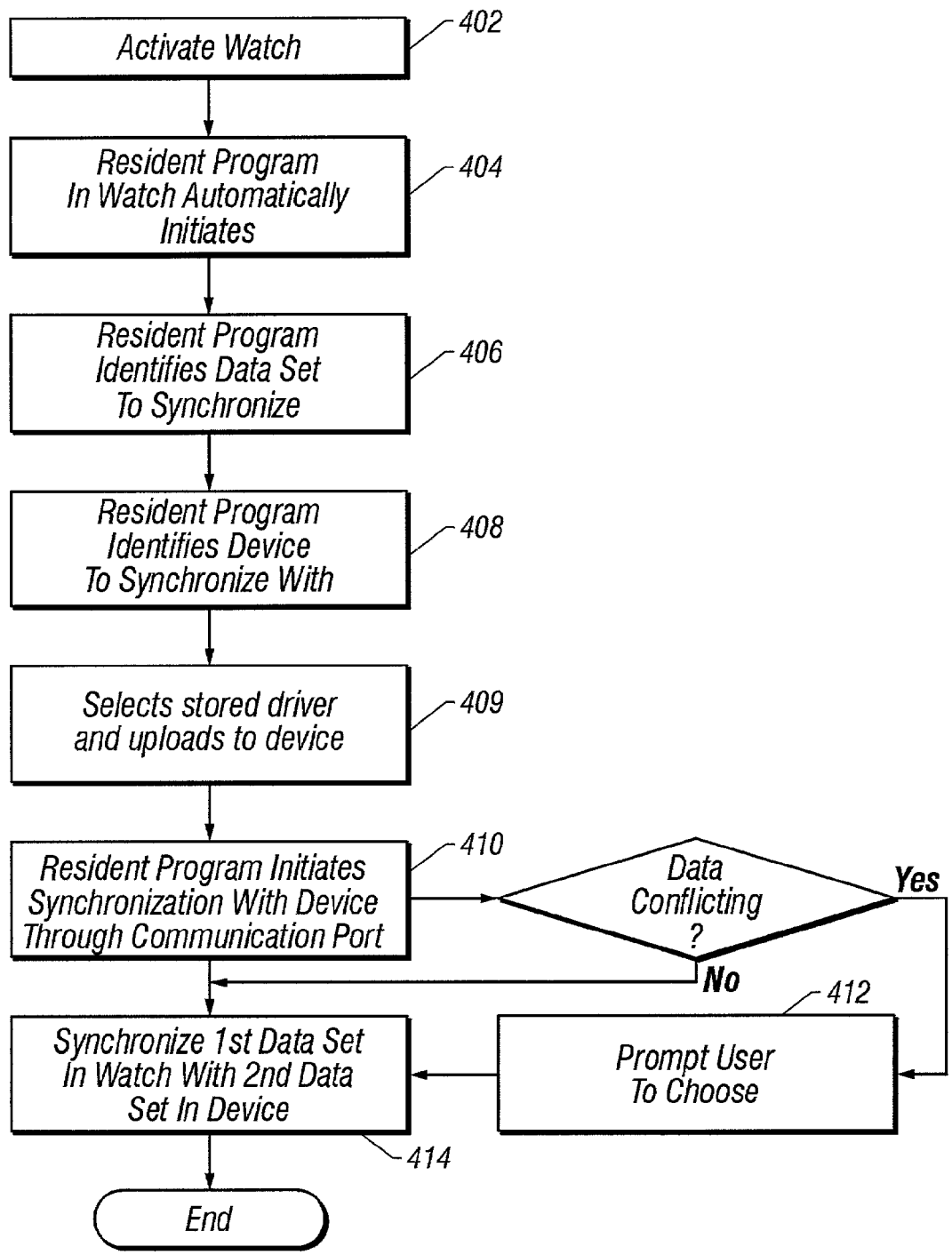
FIG. 4 is a flow chart showing the synchronized data transfer method according to the invention disclosed herein.

FIG. 4 is a process chart depicting the synchronization update routines which provide for updating the watch memory of the present invention. The user initially activates the menu selection or touches the touch screen display on the wrist watch (Step 402) which then powers up the watch microcontroller, processor and data transfer mechanism. Next, the resident configuration program stored in the watch memory is initiated automatically upon startup or at the user's instruction, causing the resident program to identify a data set to synchronize (Step 404) and then identify an external device, in this example a personal digital device, to synchronize data sets with (Step 406). The resident configuration program is then transferred from the watch to the personal digital device (e.g. a PALM device, personal digital assistance or cell phone) identifies and selects the appropriate data or allows the user to customize the information or data to be transferred from the personal digital device to the watch (Step 408) then selects the stored driver and uploads to the device (Step 409). Data is then transferred from the personal digital device to the watch automatically or by user selection with wireless means, such as Infrared (IR) radiation in this embodiment (Step 410). If conflicting data sets are recognized, the user is prompted by the resident program to decide either to overwrite the existing data set with new data or retain the existing data set (Step 412). Once the data sets in both the watch and personal digital assistant device are updated and verified as identical by the resident program, the data transfer session is terminated (Step 414) and the watch microcontroller, processor and data transfer mechanism powers down until the next session is initiated.

It should be noted that other embodiments of the flowchart defined in FIG. 4 may provide for a two way data transfer link to be established via a wire connection, RF transmission, IrDA radiation, BLUETOOTH protocol, a WAP, the internet, a LAN, an intranet or other communication means as is known in the art. Wire connections, such as fiber optic cabling, would be equipped with interior reflective materials so as to allow the wire connection to be nonlinear and still effectively transmit data between devices. It should also be noted that each of the various steps in the flowchart may either be performed either interchangeably with or without user intervention. Likewise, an alternative synchronization methodology may be implemented using the software synchronization routines and programs as disclosed in U.S. Pat. No. 6,243,705 (Kucala) and U.S. Pat. No. 5,727,202 (Kucala) which are incorporated herein by reference.

FIG. 5 is a perspective view of an alignment device 200 for proper spatial alignment of a watch 10 and personal digital assistant device, such as a cell phone 70. Alignment device 200 consists of a first support surface 204, a second support surface 206 and parabolic mirror 208. A watch 10 is placed on first support surface 204. A cellular phone 70 is placed on second support surface 206. Due to the placement of watch 10 and cellular phone 70, the data transfer mechanisms 108, 202 are aligned so as to allow the direct transmission and receipt of data between watch 10 and cellular phone 70 via wireless signals. Alternatively, watch 10 and cellular phone 70 could be placed in spatial configurations whereby data is exchanged between watch 10 and cellular phone 70 via wireless signals that are reflected off of a reflective surface, such as parabolic mirror 208. During the synchronization operations between a watch 10 and personal digital device 50, wireless communication is enabled as the alignment device 200 provides proper spatial alignment of the data transfer mechanisms 108, 202 located on each respective device. After synchronization is complete, the communication IR link is terminated. This type of solution works utilizing the fact the IR wireless communication signal can be bounced of surfaces from one device to another. Using this bouncing affect possible by IR transfer is what allows this innovative product holder of at least two devices that are to communicate.

Figure 6A:
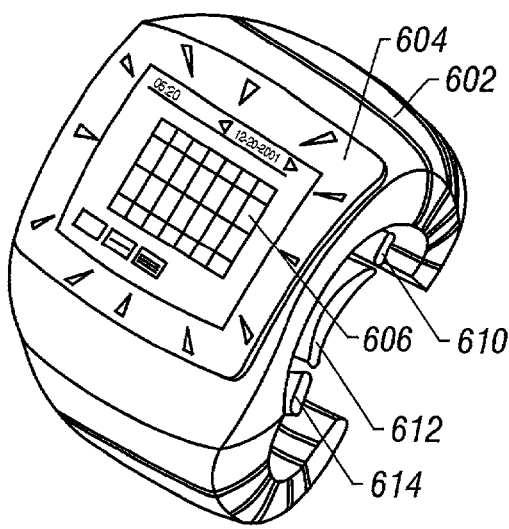
FIG. 6A is a perspective view of a digital wrist watch with a touch screen display, push buttons and rocker switch control mechanisms.

FIG. 6A is a depiction of a watch with a band or bracelet 602, a decorative ring 604, a touch screen display 606, push buttons 610, 614 and a rocker switch 612. Rocker switch 612 may be configured to provide for power actuation of the watch and access/control of the watch menu. Likewise, touch screen display 606 may provide additional menu selection operations and function as a data entry or confirm mechanism. Push buttons 610, 614 may assist in data entry by acting as scroll up/scroll down buttons for the purposes of scrolling through the menu displayed on the touch screen display 606. The methodology of this menu selection method is that the rocker switch 612 and pushbuttons 610, 614 are equipped with software codes enabling the user to operate the watch and perform synchronization operations.

For example, when the rocker switch 612 is manipulated, the watch microcontroller, processor and data transfer mechanism are powered up from basic time-keeping mode. In turn, the menu selection on the watch touch screen 606 may start the display of numbers, text and/or menus in a "telephone" pushbutton type data entry mode. Pressing the rocker switch 612 "up" or "down" would move the numbers, text and/or menus displayed on the screen 606 in the corresponding directions. If the user holds the rocker switch 612 in the "up" or "down" position, the text, numbers or menus would "scroll." When the user has found the desired text, number and/or menu, the user may depress the rocker switch 612 "inwards" to register as a "select" or "execute" command. The advantage of this innovation provides the convenience of a thumbwheel selection system as disclosed in the prior art, with the ability to minimize the housing and volume requirements of a thumbwheel mechanism and improved water and foreign object resistance required by the potential consumer.

Figure 6B:
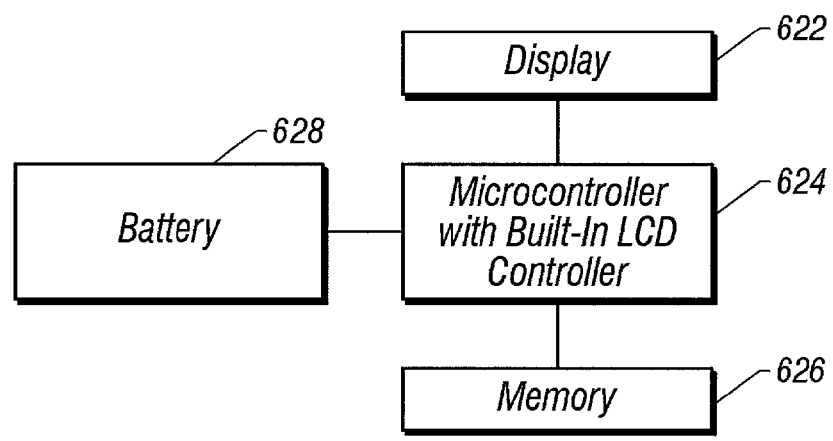
FIG. 6B is a schematic diagram showing a prior art solution for powering a watch with a display.

FIG. 6B depicts a prior art solution which provides a display 622, a microcontroller with built-in LCD controller 624, a memory 626, and a power supply 628 for operation of the watch or PDA. In current types of Palm OS devices, the microcontroller 624 is integrated with an LCD controller that is used to control the information on the display 622. The problem with this hardware configuration is that the microcontroller with integrated LCD controller 624 must be running to keep the display 622 active. Current microcontrollers, such as the DRAGONBALL processor-line from Motorola, are very power consumptive. By placing the PALM OS into a watch memory, it is desired that the watch perform time-keeping when the operating system (OS) is not running. Using the hardware configuration illustrated in FIG. 6B would result in a solution with a greatly diminished battery life as the microcontroller 624 consumes large amounts of power in keeping the display 622 active.

Figure 6C:
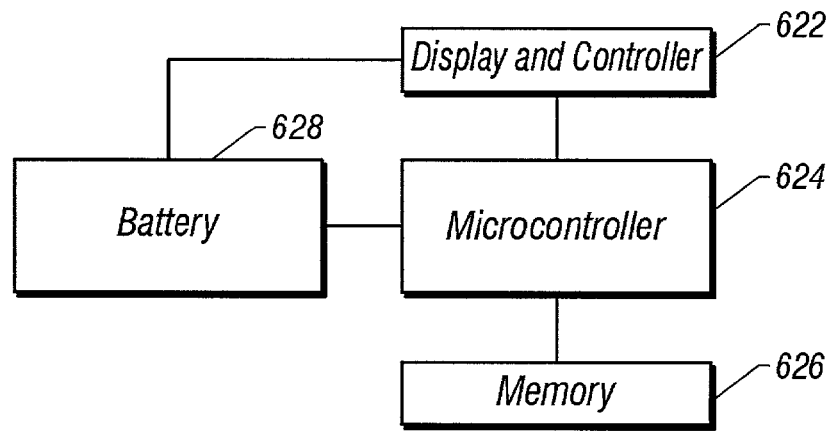
FIG. 6C is a schematic diagram showing the improved solution for powering a watch display according to the invention described herein.

FIG. 6C illustrates a preferred hardware configuration necessary to allow the watch to display information on the LCD display, even when the microcontroller is not running the operating system. In this configuration, the display 622 is integrated with a controller to provide display operations. In this arrangement, the microcontroller 624 is not required to remain powered in order to drive the display 622. Typically LCD controllers can consume 0.1 mA–0.25 mA of power versus 6–8 mA for the display with integrated controller allowing extension of battery 35–100 times longer. In the present solution, when only displaying time in hours and minutes on the watch, the display with integrated microcontroller 624 runs in standby mode most of the time consuming very little power, running either internal or external real-time clock, and would only have to switch on for a fraction of a second to update the LCD with integrated controller 622 which would continue to provide the information for display. When data operations are desired by the user, microcontroller 624 is powered and the operating system functions accordingly. As a result, this embodiment provides for a usable watch running a PALM OS which is also capable of displaying the time without requiring the user to turn the watch off when it is not in use. Those skilled in the art can appreciate other alternative embodiments of an LCD controller which may or may not have the LCD controller chips integrated either internally or externally.

It can also be seen that the LCD could be replaced by an electrophoretic display, such as that developed by E-INK or an organic light emitting device (OLED) as developed by Universal Display Corporation. This type of display has added advantage that it can retain an image for several seconds up to several minutes. Integrated into a watch the preferred solution is one where the electrophoretic display is capable of retaining image for at least one minute. In this embodiment the microcontroller would update the controller/driver solution being used to address the electrophoretic display. The new image would be updated on the display and all internal electronic devices including: microcontroller, controller/driver solution used to drive electrophoretic display, could go into standby mode running only the real-time clock until one minute has passed and then update the new information to be displayed. As a result, the microcontroller may go into a "standby" mode powering up only when needed.

The ability to power up the watch microcontroller, processor and display with one touch of the display surface conserves power by allowing the processor and display to power up and down depending on actual usage requirements. In contrast, PDA's such as the Palm device, require constant power to be supplied to the data transfer system, which could be IR or RF, which allows the user to send and receive information. Likewise, Palm PDA's utilize a Motorola DRAGONBALL processor which must always be running to power and control the PDA display, touch screen, including a time display function. Operation of the data transfer system and DRAGONBALL processor consume a considerable amount of available battery power, and in a smaller watch configuration, this type of "always on" power consumption would rapidly deplete the watch power supply. In order to overcome these drawbacks in a watch size configuration, the novel ability to power up and power down the data transfer mechanism by contacting the watch display, provides power to the watch microcontroller, processor and data transfer mechanism only when they are required for synchronization or menu applications. Further, the watch microcontroller may be configured to operate in a standby mode while powering either an internal or external clock mechanism for the watch.

Figure 7A:
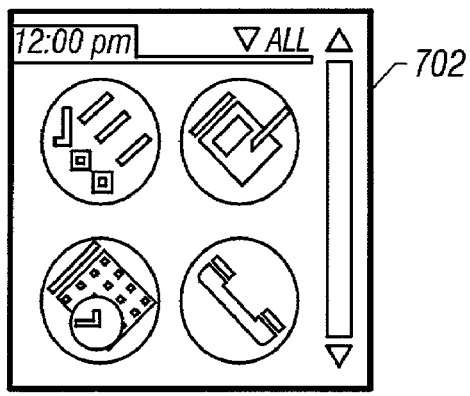
FIGS. 7A–7D depict various exemplary information displays containing information for user access and synchronization.
Figure 7B:
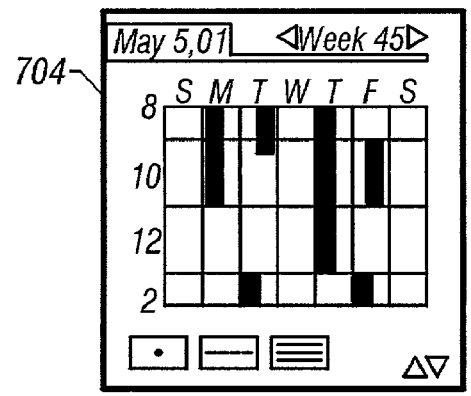
Figure 7C:
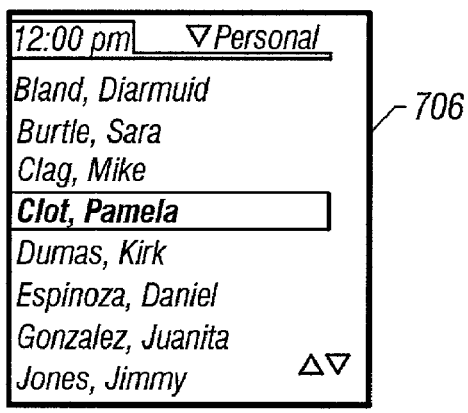
Figure 7D:
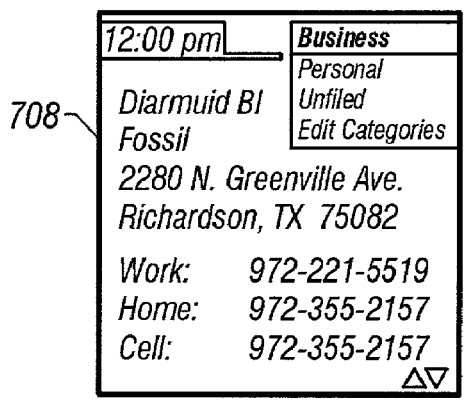

FIGS. 7A–7D are examples of the various menus and information which could be stored on the wrist watch memory and synchronized with another digital device utilizing an operating system such as the Palm OS. FIG. 7A depicts a central or "home" menu 702 with icons representing a task list menu, a calendar menu, a contact menu and a scheduled appointments menu. FIG. 7B is a depiction of a calendar sub-menu 704 which provides storage and access to the user's calendar and important dates. FIG. 7C is a depiction of a contacts sub-menu 706 which provides storage and access to the user's list of addresses, telephone numbers, and email addresses for clients, friends and family. FIG. 7D is a depiction of an individual contact sub-menu 708 which displays the selected contact's address and phone number information. These depictions are exemplary in nature and are not to be construed as limitations on the amounts or types of information that can be stored and synchronized between the devices discussed herein.

Nearly all of the current PDA handhelds utilize a touchscreen for easy user entry of commands or information. The stylus used is typically a small plastic device looking much like a pencil or pen. Incorporating a touchscreen into a wearable device such as a wrist watch is not difficult, but on a wrist watch device there is little space to store a hard plastic stylus several inches in length. The following figures illustrate several innovative stylus concepts that provide user way of inputting information on the touchscreen, and styluses that can be integrated into the wearable device for storage when not in use.

Figure 8A:
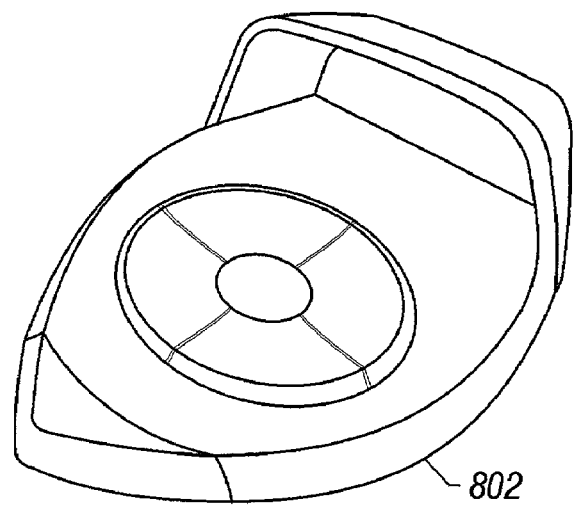
FIG. 8A is a perspective view of a finger stylus for use in operating the touch screen display on the watch face.
Figure 8B:
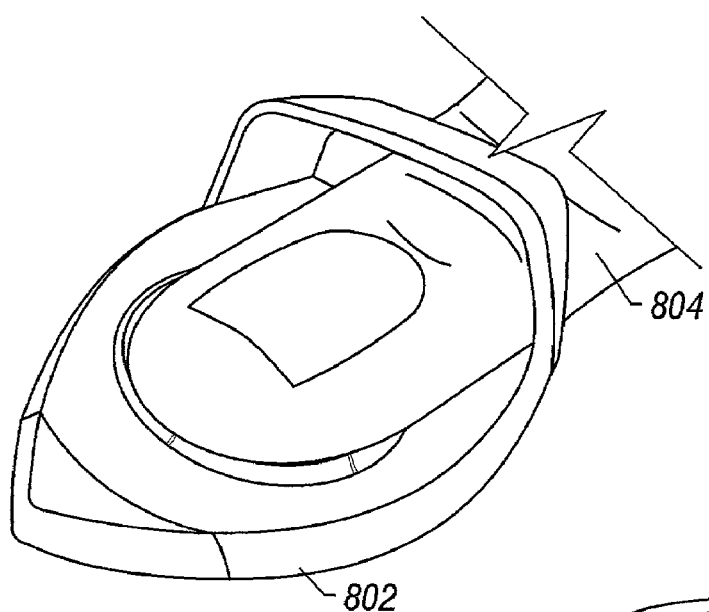
FIG. 8B is another perspective view of the finger stylus as positioned on a user's finger.
Figure 8C:
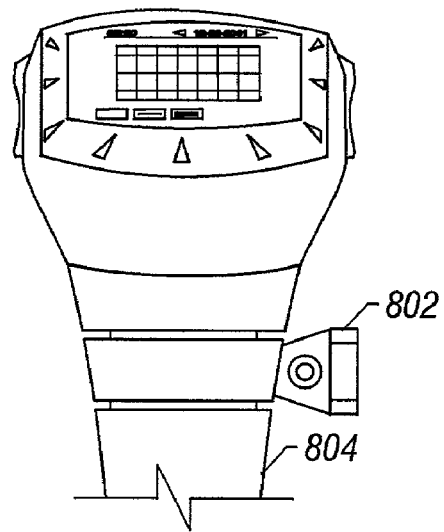
FIG. 8C depicts the storage slot for the finger stylus located on the watch band.

FIG. 8A depicts one embodiment of a stylus which may be used to activate and manipulate the touch screen display capability of the watch device. Specifically, since the majority of PDA operating systems are equipped with a user interface which utilizes touch screen user input, a stylus solution will likely be desired by the user for interaction with the touch screen display. Due to the inherent size and storage space limitations in a watch, the finger stylus 802 represents a novel solution to these limitations. FIG. 8B depicts the finger stylus 802 removed from a storage slot on the watch band and slipped on to the finger 804 of the user. The user may then simply tap or drag the finger stylus 802 across the watch touch screen and manipulate the icons and data associated therewith. FIG. 8C shows the preferred storage solution which is a slot on the band 804 for accepting and holding the finger stylus 802 while it is not in use. This innovative stylus could also be stored in the watch case or near the buckle on the strap 804.

Figure 9A:
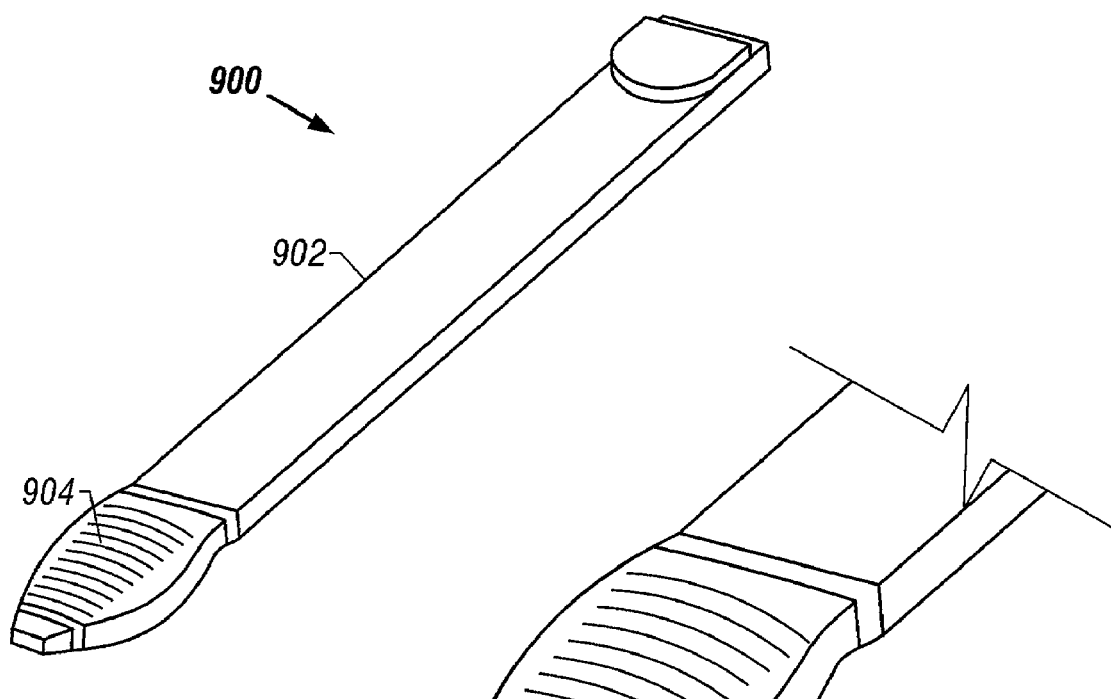
FIG. 9A is a perspective view of a stylus with a pear shaped tip for use in operating the touch screen display.
Figure 9B:
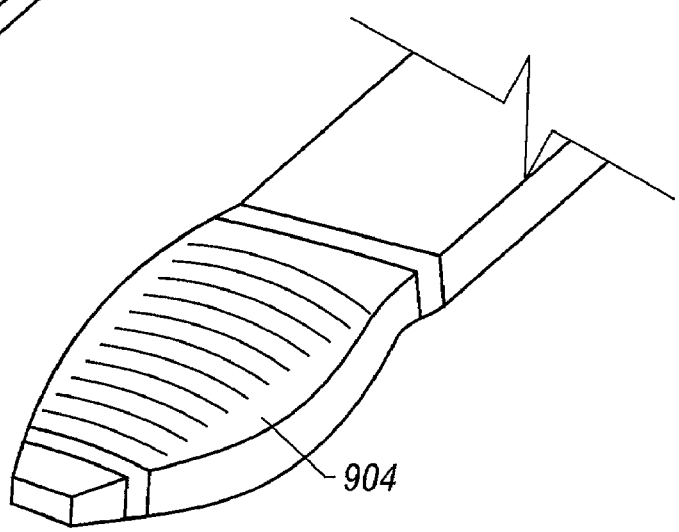
FIG. 9B is an exploded view of the pear shaped stylus tip.
Figure 9C:
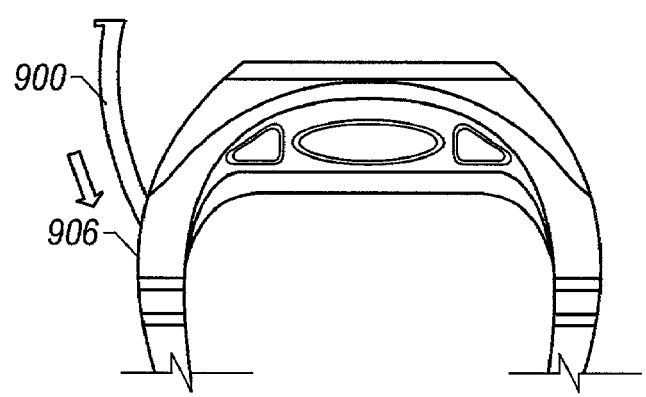
FIG. 9C is a side view showing the storage for the stylus with a pear shaped tip located within the watch band.

FIG. 9A shows an alternative embodiment for a stylus solution 900 which consists of a flexible material in the shape of a thin rectangular pick 902 with a shaped head 904. FIG. 9B is an exploded view of the shaped stylus head 904. This embodiment provides for accuracy in selecting and manipulating icons and data via the touch screen face of the watch. FIG. 9C depicts the storage slot in the band 906 into which the stylus 900 may be stored and carried when not in use. The stylus 900 is simply placed into the slot in band 906 and flexes to match the curvature of the watchband when the watch is being worn by the user. When in use the user can rotate the stylus 900 so that it has little to no bendability in that axis so they will effective be writing with a hard plastic stylus.

Figure 10A:
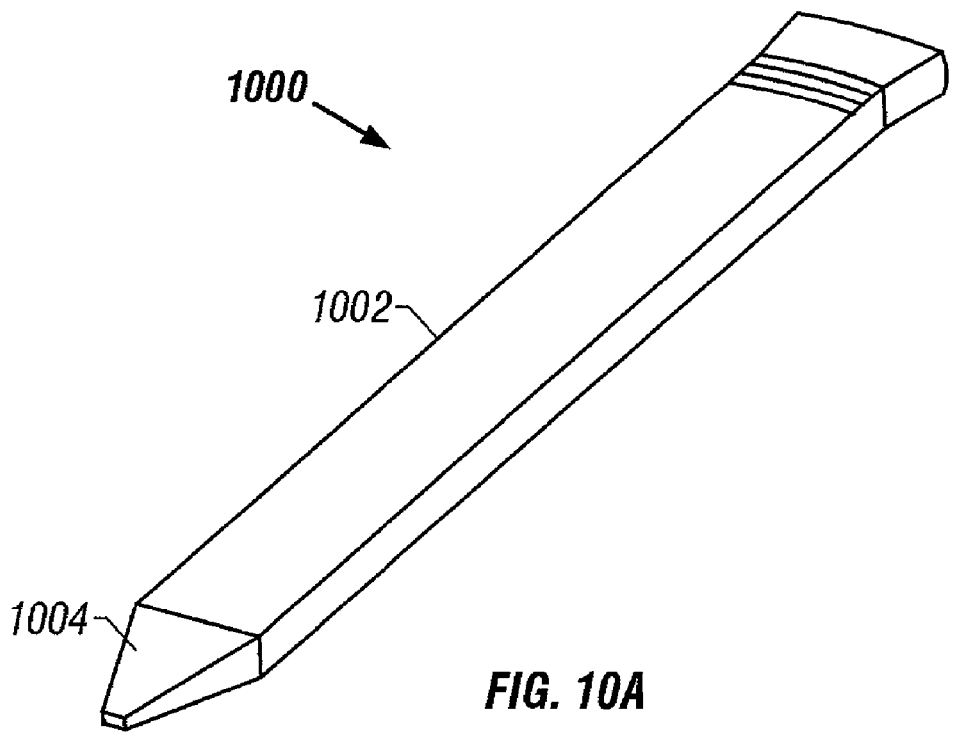
FIG. 10A is a perspective view of a stylus with a pencil or pen tip for use in operating the touch screen display.
Figure 10B:
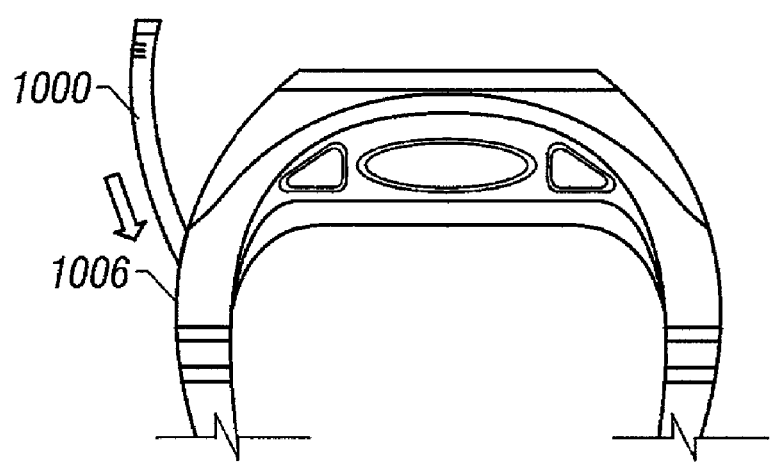
FIG. 10B depicts the storage for the stylus with a pencil or pen tip located within the watch band.

FIG. 10A shows another alternative embodiment for the stylus 1000 consisting of a thin flexible material in the shape of a thin rectangle 1002 with a pen or pencil tip 1004. This embodiment provides for the accurate selection and manipulation of icons and data via the touch screen face of the watch, as well as providing a writing implement in either pen or pencil 1004. FIG. 10B depicts the storage slot in band 1006 into which the stylus 1000 may be inserted when not in use. The stylus 1000 is made of a flexible material which will flex to match the curvature of the watchband 1006 in which it is stored when the watch is being worn by the user.

Figure 11A:
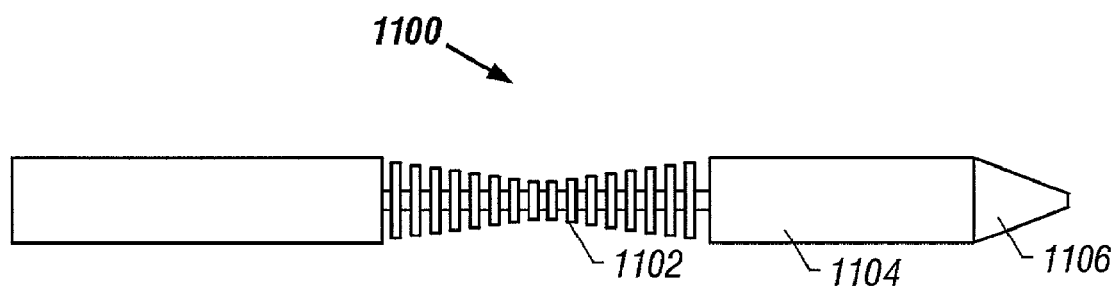
FIG. 11A is a top view of a stylus with concentric rings and pointed tip located within the watch band; and, FIG. 11B is a side view showing storage for the stylus with concentric rings and pointed tip located within the watch band.
Figure 11B:
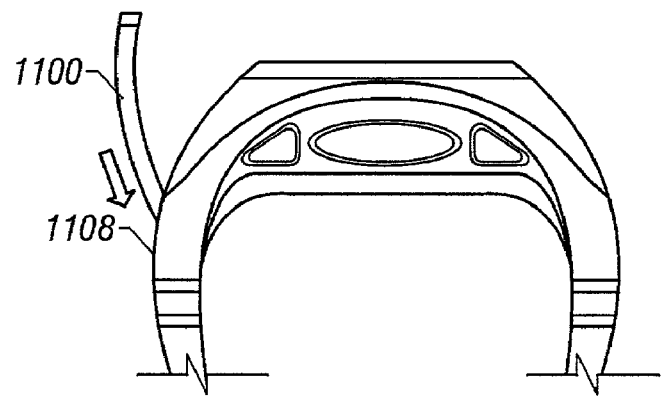

FIG. 11A presents another alternative embodiment for a stylus 1100 which consists of a rounded thin stylus 1104 with a portion consisting of concentric circular rings interconnected with a round plastic body through the center of each concentric ring 1102 and a pointed tip 1106 on one end of the stylus 1100. This design allows a larger degree of flexibility in the stylus 1100 during storage mode. FIG. 11B depicts the storage slot on band 1108 into which the stylus 1100 may be inserted when not in use. The concentric ring design of this stylus 1100 allows the stylus 1100 to flex with the curvature of the watchband 1108 in which it is stored when the watch is being worn by the user.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of conserving power in a wrist watch having an electronic display while synchronizing a first data set in a personal digital assistant device with a second data set in said wrist watch, comprising the steps of:
    (a) powering a microcontroller, a processor and a data transfer mechanism integral to said watch, wherein said watch includes a display having an integrated controller for driving said display operations;
    (b) running a configuration program resident on the watch, wherein said program identifies said second data set to synchronize;
    (c) establishing a communication link between the personal digital assistant device and the watch;
    (d) transmitting the configuration program from said watch to said personal digital assistant device via said communication link, wherein said program identifies and selects said first data set located on said device;
    (e) transferring said first data set from said personal digital assistant device to said watch via said communication link;
    (f) comparing said first and second data sets, wherein said configuration program prompts a user to synchronize said data sets when said first data set conflicts with said second data set;
    (g) overwriting said second data set with said first data set; and
    (h) powering down said watch microcontroller, processor and data transfer mechanism, upon verification by resident configuration program that said first and second data sets are identical.

2. The method of claim 1 wherein said communication link is established via wireless signals.

3. The method of claim 1 wherein said overwriting step is accomplished by erasing said second data set on the watch memory and inputting said first data set on the watch memory.

4. The method of claim 1 wherein said communication link is established via an IR port, an internet connection, an intranet connection or a satellite link.

5. A system for conserving power in a wrist watch having an electronic display while synchronizing a first data set in a personal digital assistant device with a second data set in said wrist watch, comprising the steps of:
    (a) means for powering a microcontroller, a processor and a data transfer mechanism integral to said watch, wherein said watch includes a display having an integrated controller for driving said display operations;
    (b) means for running a program resident on the watch, wherein said program identifies said second data set to synchronize;
    (c) means for identifying and selecting said first data set located on said personal digital assistant device;
    (d) means for establishing a communication link between the personal digital assistant device and the watch;
    (e) means for synchronizing said first and second data sets when said program detects a conflict between said data sets; and
    (f) means for powering down said microcontroller, processor and data transfer mechanism, while maintaining power to said display having said integrated controller.

6. The system of claim 5 further comprising means for erasing said second data set located on the memory of a watch.

7. The system of claim 6 wherein said resident program is transmitted to a memory of said personal digital assistant device.

8. The system of claim 5 wherein said communication link is established via wireless signals.

9. The system of claim 5 wherein said updating is accomplished by erasing at least one data set on the watch memory and inputting at least one updated data set on the watch memory.

10. The system of claim 5 wherein said communication link is established via an IR port, an internet connection, an intranet connection or a satellite link.

11. A system for conserving power while updating data comprising:
   (a) a personal digital assistant device having a processor and a memory containing a first data set;
   (b) an electronic watch having a display which includes an integrated controller for driving said display, wherein said watch further includes a microcontroller, a processor and a memory containing a second data set; wherein said microcontroller periodically powers up at from a standby mode to a powered mode to update said integrated controller to change the time on the display;
   (c) means for manually powering said microcontroller to initiate a memory update synchronization;
   (d) means for establishing a two way communication link between the personal digital assistant device and the watch during a memory update synchronization;
   (e) means for comparing said first data set located on the personal digital assistant memory with said second data set on the watch memory;
   (f) means for updating said second data set with said first data set when said comparing means detects a conflict between said data sets; and
   (g) means for automatically powering down said microcontroller to said standby mode upon completion of said memory update synchronization.

12. The system of claim 11 wherein the personal digital assistant device is a wristwatch, a wireless telephone, a wireless pager or a personal computer.

13. The system of claim 11 wherein the two way communication link is established via an IR port, an RF port, a wire link, a wireless link, an internet connection, an intranet connection or a satellite link.

14. A system for enabling the synchronization of data sets between a watch having an electronic display and a personal digital assistant device while conserving power in the watch, comprising:
   (a) an integrated controller incorporated into said electronic display, wherein said integrated controller drives said display;
   (b) a microcontroller connected to said display, wherein said microcontroller automatically and periodically activates from a standby mode to a momentary powered mode to update said integrated controller to change the time on the display;
   (c) a processor connected to said microcontroller;
   (d) a memory connected to said processor, wherein said memory contains a first data set and an operating system;
   (e) means for manually activating said microcontroller to initiate a memory update synchronization;
   (e) means for establishing a two way communication link between said watch and said personal digital assistant device upon initiation of said memory update synchronization;
   (f) means for synchronizing said first data set with a second data set located on the personal digital assistant device; and
   (g) means for automatically powering down said microcontroller to said standby mode upon completion of said memory update synchronization.

15. The system of claim 14 wherein said means for synchronizing comprises:
   i) means for comparing said first data set with said second data set; and
   ii) means for updating said first data set with said second data set when said comparing means detects a conflict between said data sets.

16. The system of claim 14 wherein the electronic display is a liquid crystal display, an electrophoretic display or an organic light emitting device display.

17. The system of claim 14 wherein the means for manually activating said microcontroller comprises a touch screen, a push-button or a rocker switch.

18. The system of claim 14 wherein the microcontroller automatically activates at least once every minute from a standby mode to a momentary powered mode to update said integrated controller to change the time on the display.

19. The system of claim 14 wherein the microcontroller automatically activates at least once every second from a standby mode to a momentary powered mode to update said integrated controller to change the time on the display.

20. The system of claim 14 wherein the microcontroller automatically activates at least once every tenth of a second from a standby mode to a momentary powered mode to update said integrated controller to change the time on the display.

21. The system of claim 14 wherein the two way communication link means comprises an IR port, an RF port, a wire link, a wireless link, an internet connection, an intranet connection or a satellite link.

* * * * *